United States Patent
Nishiyama

(10) Patent No.: US 8,314,971 B2
(45) Date of Patent: Nov. 20, 2012

(54) APPARATUS AND METHOD FOR IMAGE PROCESSING

(75) Inventor: Tomohiro Nishiyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 699 days.

(21) Appl. No.: 12/501,354

(22) Filed: Jul. 10, 2009

(65) Prior Publication Data
US 2010/0014120 A1  Jan. 21, 2010

(30) Foreign Application Priority Data
Jul. 16, 2008  (JP) .................... 2008-185292

(51) Int. Cl.
*H04N 1/405* (2006.01)
(52) U.S. Cl. .................... 358/3.01; 358/2.1; 358/468
(58) Field of Classification Search .................. 358/3.01, 358/1.9, 2.1, 3.32, 1.12, 1.18, 296, 504, 406, 358/500, 400, 530
See application file for complete search history.

(56) References Cited

U.S. PATENT DOCUMENTS
| | | | |
|---|---|---|---|
| 6,733,105 B2 | 5/2004 | Tatsumi | |
| 7,877,053 B2 * | 1/2011 | Ng et al. | 399/341 |
| 2012/0062956 A1 * | 3/2012 | Kitagawa et al. | 358/2.1 |

FOREIGN PATENT DOCUMENTS
| | | |
|---|---|---|
| JP | 2002-0167681 A | 6/2002 |
| JP | 2002-307755 A | 10/2002 |

OTHER PUBLICATIONS

Robert Floyd et al, "An Adaptive Algorithm for Spatial Greyscale", Proceeding of the S.I.D., vol. 17/2, 1976, pp. 75-76.

* cited by examiner

*Primary Examiner* — Thomas D Lee
*Assistant Examiner* — Stephen M Brinich
(74) *Attorney, Agent, or Firm* — Canon U.S.A., Inc., IP Division

(57) ABSTRACT

Image data including color separation data and gloss data of an image is input. The color separation data is quantized to generate a color signal. The gloss data of the image is quantized on the basis of the color signal and gloss data related to a recording medium, a color material, and a gloss control material to generate a gloss signal. An image is formed on the recording medium on the basis of the color signal and the gloss signal using the color material and the gloss control material.

15 Claims, 14 Drawing Sheets

FIG. 6

| 30 | 30 | 30 | 50 | 45 | 50 |
|----|----|----|----|----|----|
| 30 | 30 | 60 | 50 | 50 | 50 |
| 10 | 10 | 45 | 30 | 45 | 60 |
| 10 | 10 | 10 | 30 | 45 | 60 |
| 5  | 5  | 10 | 30 | 50 | 50 |
| 5  | 5  | 10 | 30 | 50 | 50 |

| 25 | 0  | 25 | 0  | 0  | 25 |
|----|----|----|----|----|----|
| 0  | 25 | 0  | 25 | 0  | 25 |
| 0  | 25 | 25 | 0  | 25 | 0  |
| 25 | 0  | 25 | 0  | 0  | 0  |
| 0  | 25 | 0  | 25 | 0  | 25 |
| 0  | 0  | 25 | 0  | 25 | 0  |

⊘ GLOSS CONTROL MATERIAL SUPERIMPOSED ON COLOR MATERIAL ON RECODING MEDIUM (G_Ink_Clear)

○ GLOSS CONTROL MATERIAL ON RECORDING MEDIUM (G_Medium_Clear)

● COLOR MATERIAL ON RECODING MEDIUM (G_Ink)

☐ RECORDING MEDIUM (G_Medium)

| 25 | 0 | 25 | 75 | 0 | 100 |
|---|---|---|---|---|---|
| 0 | 100 | 0 | 100 | 0 | 100 |
| 0 | 25 | 100 | 0 | 100 | 0 |
| 25 | 0 | 25 | 0 | 75 | 75 |
| 0 | 25 | 0 | 100 | 0 | 100 |
| 0 | 0 | 25 | 0 | 100 | 0 |

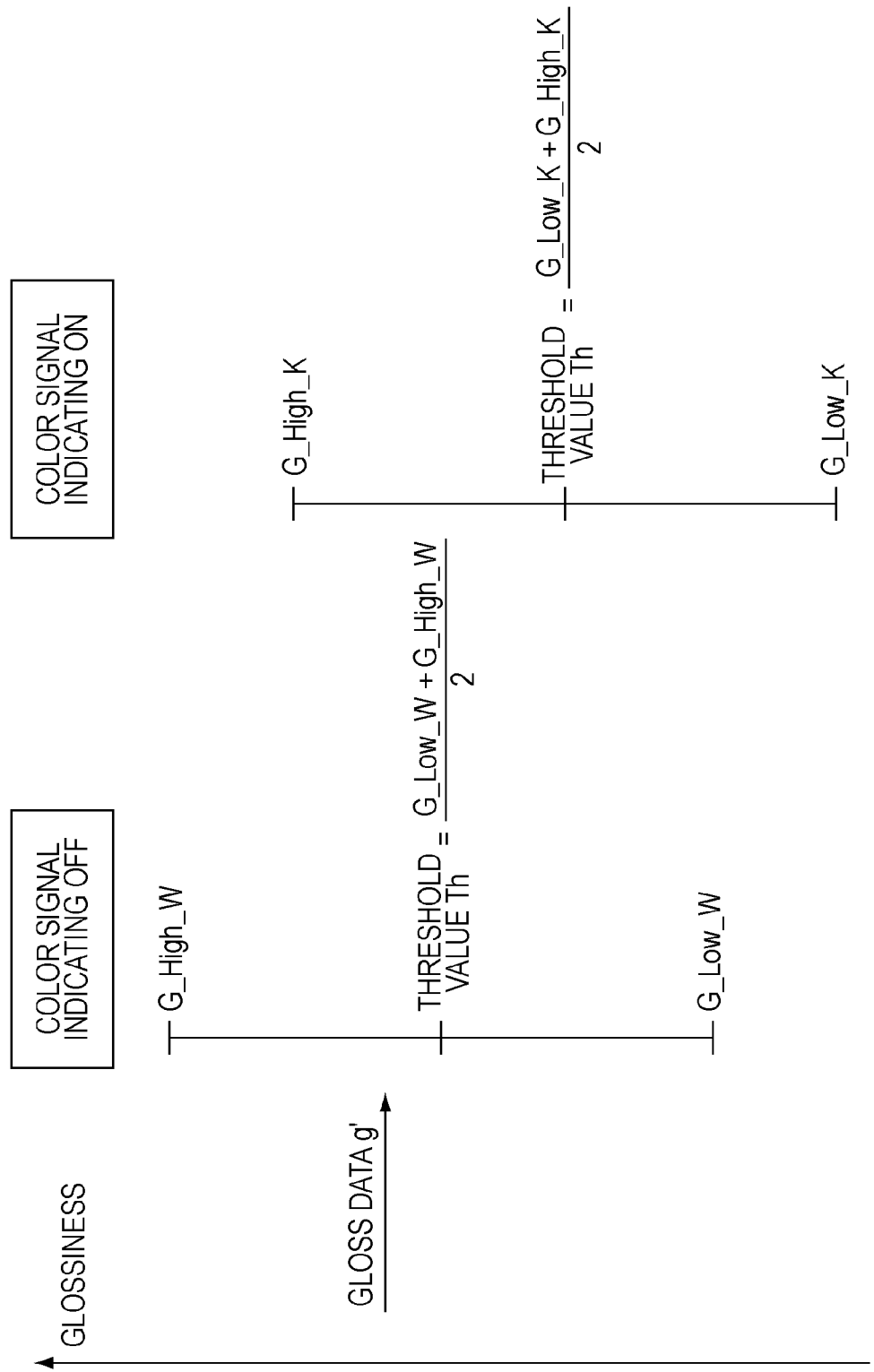

| 25 | 0 | 25 | 75 | 0 | 100 |
| 0 | 100 | 0 | 100 | 0 | 100 |
| 0 | 25 | 100 | 0 | 100 | 0 |
| 25 | 0 | 25 | 0 | 75 | 75 |
| 0 | 25 | 0 | 100 | 0 | 100 |
| 0 | 0 | 25 | 0 | 100 | 0 |

APPARATUS AND METHOD FOR IMAGE PROCESSING

BACKGROUND OF THE INVENTION

1. Field of the Invention

The present invention relates to image processing for reproducing a color and texture.

2. Description of the Related Art

Color materials for inkjet printers include dye-based ink and pigment-based ink. The dye-based ink contains water as the main component. Such a color material dissolved in a solvent easily penetrates into a recording medium. Accordingly, the dye-based ink offers excellent color reproduction and the surface of the recording medium subjected to recording using the dye-based ink is even. The dye-based ink is therefore excellently suitable for photo printing. Disadvantageously, if the recording medium subjected to recording using the dye-based ink is exposed to light or air, a recorded image fades, namely, color fading occurs over time because dye molecules are easily decomposed.

On the other hand, the pigment-based ink sharply expresses the outline of a character or the like and contrast and has excellent light-fastness and water-fastness. However, the pigment-based ink hardly penetrates into a recording medium because particles of the pigment-based ink having a size ranging from tens of nanometers to several micrometers are dispersed in a solvent. Accordingly, the particles deposit on the surface of the recording medium, so that the surface of a recording area in a recorded image slightly differs in fine structure from that of a non-recording area. Disadvantageously, the smoothness of the entire surface of the recording medium is lost. Such a phenomenon that glossiness varies depending on color density or color in a recorded image, namely, gloss unevenness occurs. If rough areas and matte areas are mixed in an image due to gloss unevenness, these areas are likely to be recognized as image defects in, especially, photograph printing. Japanese Patent Laid-Open No. 2002-307755 discloses a method of applying clear ink in an image area with little colored ink to reduce unevenness on the surface of an image and prevent diffused reflection of light on the surface, thus maintaining gloss evenly.

Gloss unevenness is not confined to inkjet printers using pigment-based ink. Such a problem also occurs in electrophotographic printers for fixing toner onto a recording medium to record an image. U.S. Patent Laid-Open No. 2002-0167681 discloses a method of maintaining gloss evenly using clear toner in a manner similar to the above-described inkjet printer using the pigment-based ink.

Image reproduction using a printer was initially intended to faithfully reproduce colors of an object. After that, demands for faithful reproduction of gloss and physical characteristics of the surface of the object in addition to the color reproduction have grown. In this specification, the physical characteristics other than the grayscale levels of colors of an object will be called "texture" and reproducing texture will be called "texture reproduction" hereinafter. The texture of an object includes not only gloss but also the structure of the surface of the object and the bidirectional reflectance distribution function thereof. The bidirectional reflectance distribution function is a function that defines how light is reflected in each direction when light coming from a certain direction is incident on a certain point on the surface of an object.

To meet the demands for texture reproduction, a clear color material is used as a material that adds new texture, which has not been provided in conventional printing, to a printed material. For example, clear ink is applied to a character area to make the glossiness of the character area differ from that of a portion surrounding the character area, thus decorating a character.

Further advanced techniques include a technique of reproducing glossinesses of an object in a printed material as faithful as possible. This technique will be called "gloss reproduction" hereinafter. According to a method disclosed in U.S. Pat. No. 6,733,105, in order to reproduce glossinesses of an object, illumination light is applied to the object to measure gloss signals and a formation pattern of 16 gloss control materials according to the levels of the gloss signals is used. The gloss control materials are applied in accordance with the formation pattern to control gloss, thus reproducing the glossinesses of the object.

The above-described methods disclosed in Japanese Patent Laid-Open No. 2002-307755 and U.S. Patent Laid-Open No. 2002-0167681 intend to entirely ensure even glossiness of a printed material without taking into glossinesses of an object. In other words, the methods disclosed in Japanese Patent Laid-Open No. 2002-307755 and U.S. Patent Laid-Open No. 2002-0167681 do not perform gloss reproduction. The use of a formation pattern for specifying how to apply gloss control materials is disclosed by R. Floyd and L. Steinberg in "An Adaptive Algorithm for Spatial Greyscale", Proceeding of the S.I.D., Vol. 17/2, 1976, pp. 75-76 (hereinafter, referred to as "Non-patent Document 1"). However, the formation pattern can express glossinesses corresponding to the limited number of grayscale levels. In addition, if a periodic pattern is generated by a formation pattern, the periodic pattern is recognized as image quality degradation as in a dither pattern obtained by quantizing the grayscale levels of a color. Furthermore, it is difficult to perform fine adjustment on glossiness because the texture of a recording medium or that of a color material is not taken into consideration.

SUMMARY OF THE INVENTION

The present invention provides fine reproduction of a color and texture.

According to an aspect of the present invention, an image processing apparatus includes an input unit configured to input image data including color separation data and gloss data of an image, a color signal generation unit configured to generate a color signal obtained by quantizing the color separation data, a gloss signal generation unit configured to generate a gloss signal obtained by quantizing the gloss data of the image on the basis of the color signal and gloss data related to a recording medium, a color material, and a gloss control material, and a forming unit configured to form an image on the recording medium on the basis of the color signal and the gloss signal using the color material and the gloss control material.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

FIG. 6 is a diagram illustrating glossinesses, expressed numerically, of respective pixels of an image.

FIG. 13 is a diagram illustrating the relationship between each threshold value and corresponding quantization levels.

DESCRIPTION OF THE EMBODIMENTS

Preferred embodiments of the present invention will now be described in detail in accordance with the accompanying drawings.

In the following description, gloss data will be used as an example of texture data.

Configuration of Apparatus

Figure 1:
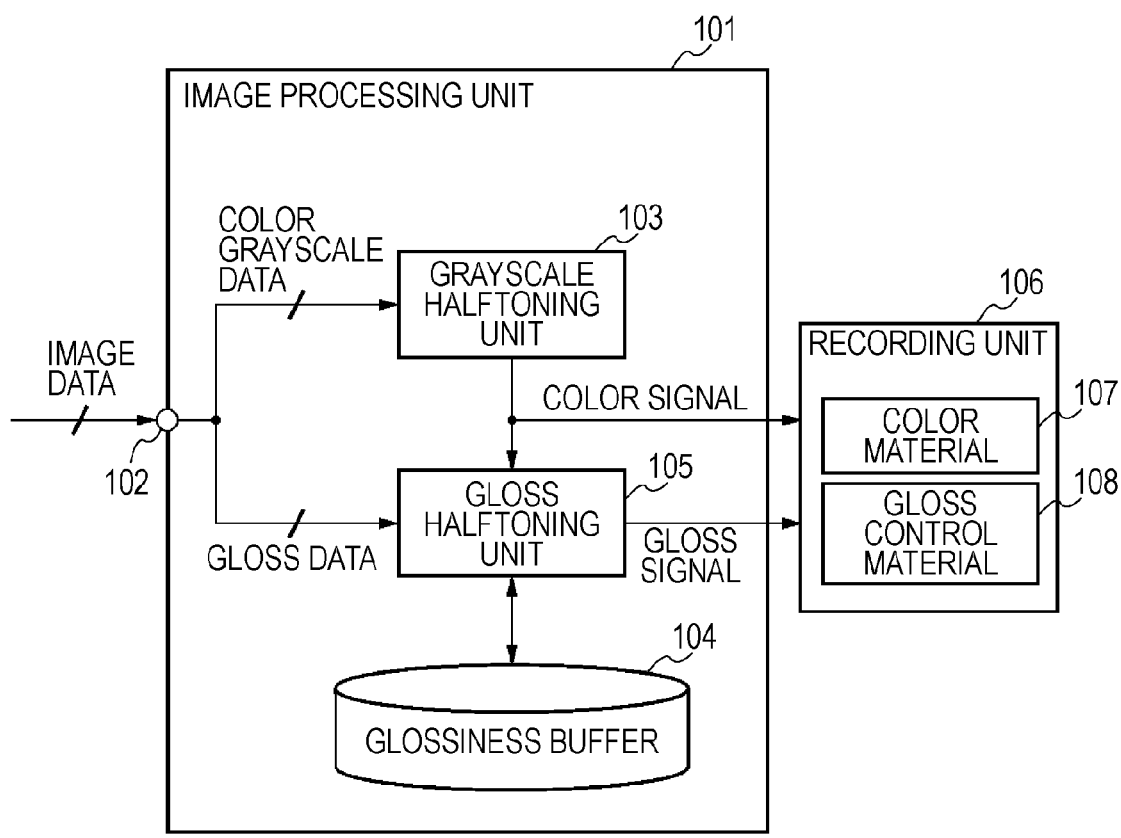
FIG. 1 is a block diagram illustrating an exemplary configuration of an image processing apparatus according to a first embodiment of the present invention.

FIG. 1 is a block diagram illustrating an exemplary configuration of an image processing apparatus according to a first embodiment of the present invention.

An input unit 102 of an image processing unit 101 receives or inputs image data. In the present embodiment, image data includes multi-level data (hereinafter, "grayscale data"), such as color separation data (e.g., CMYK data) obtained by subjecting RGB data to color conversion, indicating the amount used of a color material (the grayscale level of a color), and multi-level data (hereinafter, "gloss data") indicating glossiness of, for example, an object. The image data input to the input unit 102 is separated into color grayscale data and gloss data. The input unit 102 may receive the color grayscale data and the gloss data individually.

A grayscale halftoning unit 103 quantizes the color grayscale data. A gloss halftoning unit 105 refers to a glossiness buffer 104 to perform quantization related to gloss on the gloss data. In the following description, for the sake of simplicity, it is assumed that quantization is binarization, the grayscale halftoning unit 103 outputs a color signal indicating application or non-application (ON or OFF) of a color material, and the gloss halftoning unit 105 outputs a gloss signal indicating ON or OFF of a gloss control material.

The glossiness buffer 104 previously stores gloss data (glossinesses) related to the gloss characteristics of a recording medium, those of a color material, and those a gloss control material, and the gloss characteristics of the combinations of them. The glossinesses are expressed as follows.

G_Medium: the glossiness of the surface of the recording medium;

G_Ink: the glossiness obtained by applying the color material to the recording medium;

G_Medium_Clear: the glossiness obtained by applying the gloss control material to the recording medium; and G_Ink_Clear: the glossiness obtained by applying the color material to the recording medium and superimposing the gloss control material to the color material on the recording medium, where it is assumed that applying the gloss control material increases glossiness as G_Ink<G_Ink_Clear and G_Medium<G_Medium_Clear.

The gloss control material is a transparent recording material used for gloss control. In this specification, it is assumed that glossiness (or gloss data) is specular glossiness defined by JIS Z 8741. The specular glossiness is obtained by measuring a specular reflection component of incident light. There are five kinds of measuring methods depending on angles of incidence. In the present embodiment, specular glossiness obtained at an incident angle of 75 is used.

A recording unit 106 records an image on the recording medium on the basis of print data (a color signal and a gloss signal) supplied from the image processing unit 101. In the present embodiment, the recording unit 106 includes an inkjet printer using the color material, indicated at 107, and the gloss control material, indicated at 108. As for the color material, four colors, namely, cyan, magenta, yellow, and black are generally used. In the following description, for the sake of simplicity, the color material has a single color. In other words, the recording unit 106 applies the color material 107 in accordance with a color signal and applies the gloss control material 108 in accordance with a gloss signal.

Image Processing Unit

Figure 2:
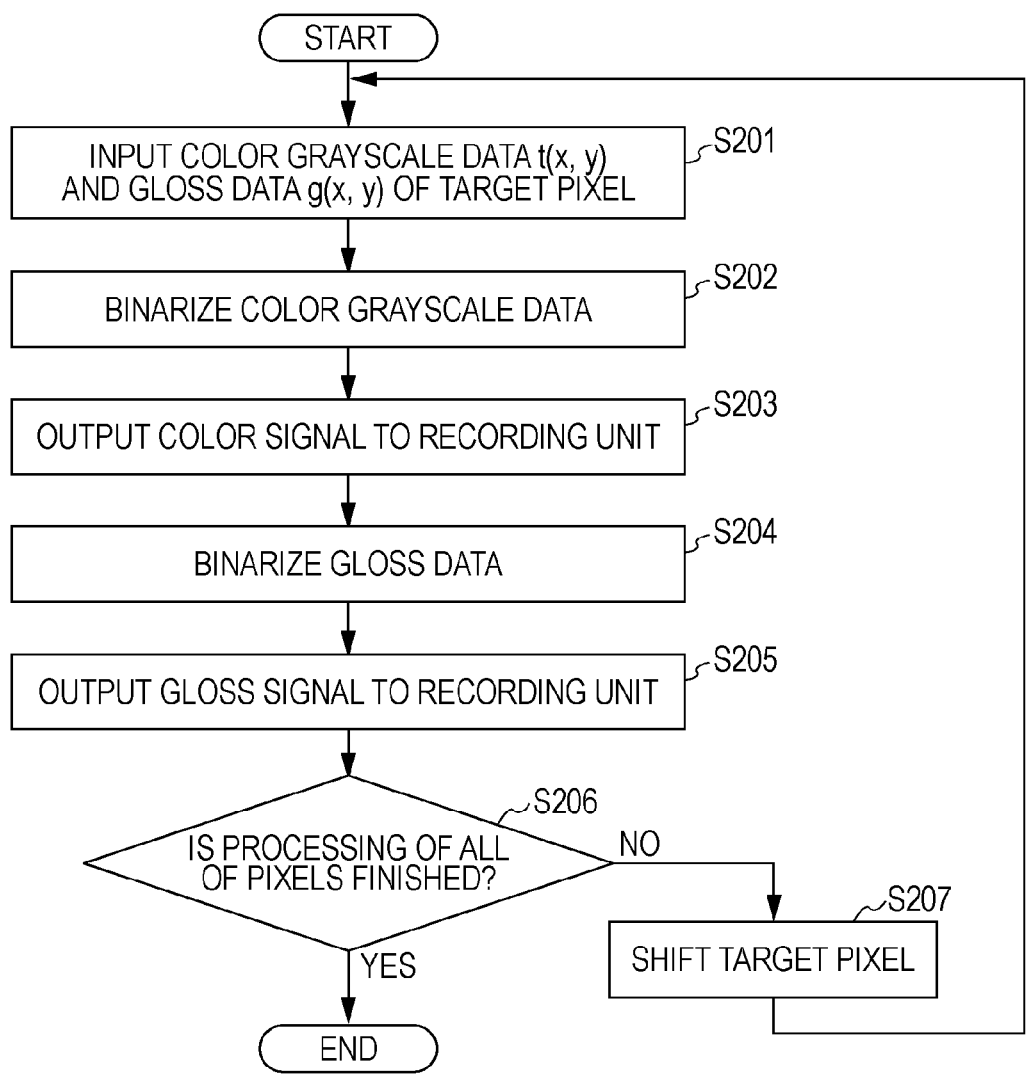
FIG. 2 is a flowchart explaining an operation of an image processing unit.

FIG. 2 is a flowchart explaining an operation of the image processing unit 101.

The image processing unit 101 receives or inputs color grayscale data t(x, y) and gloss data g(x, y) of a target pixel (x, y) (step S201). The grayscale halftoning unit 103 performs error diffusion to binarize the color grayscale data t(x, y) (step S202). As for the error diffusion, a method disclosed in Non-patent Document 1 may be used. A color signal generated by binarization is output to the recording unit 106 (step S203).

As will be described in detail below, the image processing unit 101 allows the gloss halftoning unit 105 to binarize the gloss data g(x, y) with reference to the glossiness buffer 104 (step S204) and output a gloss signal, generated by binarization, to the recording unit 106 (step S205).

The image processing unit 101 repeats steps S201 to S205 until it is determined in step S206 that processing of all of pixels in the image to be recorded is finished. If there is an unprocessed pixel, the target pixel (x, y) is shifted to another in the order of raster scanning (step S207). After that, the process is returned to step S201.

Gloss Halftoning Unit

Figure 3:
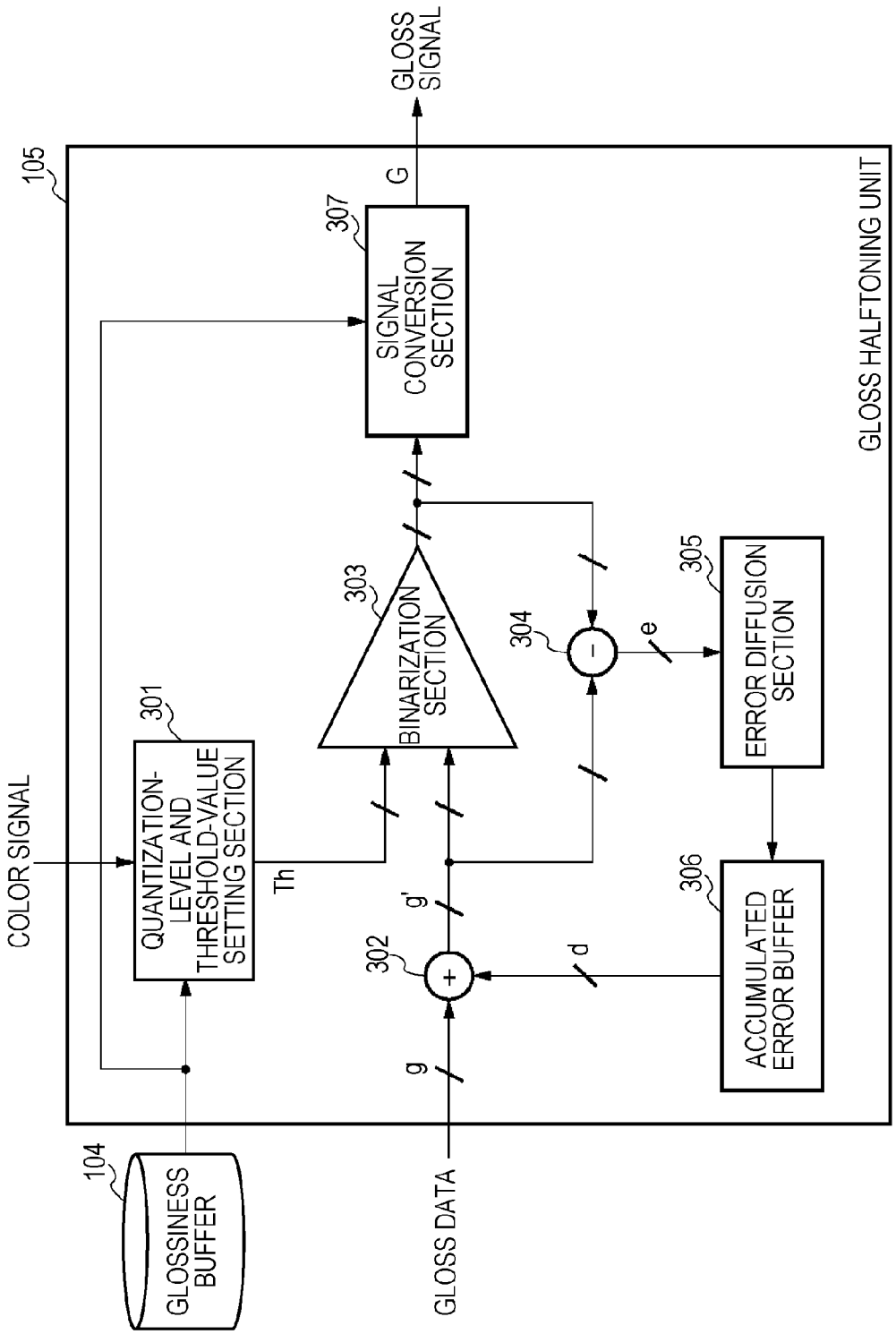
FIG. 3 is a block diagram illustrating an exemplary configuration of a gloss halftoning unit.

FIG. 3 is a block diagram illustrating an exemplary configuration of the gloss halftoning unit 105.

A quantization-level and threshold-value setting section 301 sets output values (hereinafter, "quantization levels") obtained by quantizing the glossiness and a threshold value Th with reference to data in the glossiness buffer 104 and the color signal.

An adder 302 adds a quantization error diffusion value d(x, y) to the gloss data g(x, y). A binarization section 303 binarizes data g'(x, y) output from the adder 302 using the threshold value Th set by the quantization-level and threshold-value setting section 301. A signal conversion section 307 refers to the glossiness buffer 104 to convert an output of the binarization section 303 into a gloss signal (indicating "0" or "1").

A subtractor 304 calculates the difference (quantization error e(x, y)) between the output of the binarization section 303 and that of the adder 302. An error diffusion section 305 diffuses the quantization error to each unbinarized pixel in accordance with a predetermined error diffusion matrix. An accumulated error buffer 306 accumulates diffused errors for each pixel. In other words, the adder 302 adds the diffusion value d(x, y) of the target pixel, accumulated in the accumulated error buffer 306, to the gloss data of the target pixel.

Figure 4:
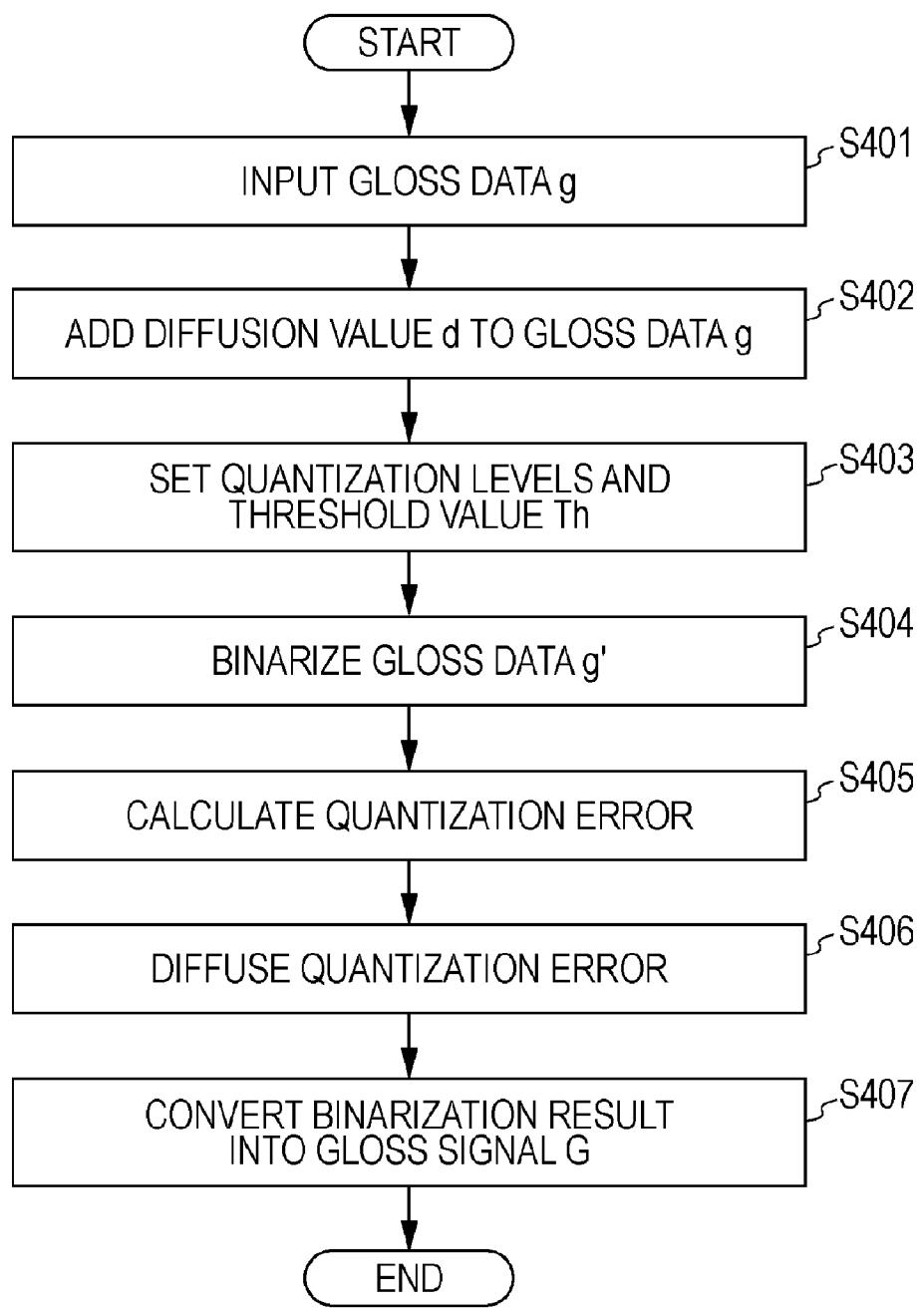
FIG. 4 is a flowchart explaining an operation, performed on each pixel, of the gloss halftoning unit.

FIG. 4 is a flowchart explaining an operation (corresponding to steps S204 and S205), performed on each pixel, of the gloss halftoning unit 105.

The gloss halftoning unit 105 receives or inputs the gloss data g(x, y) (step S401). The adder 302 adds the diffusion value d(x, y) to the gloss data g(x, y) (step S402). An initial value of the diffusion error d(x, y) is "0".

$$g'(x, y) = g(x, y) + d(x, y) \quad (1)$$

The gloss halftoning unit 105 allows the quantization-level and threshold-value setting section 301 to set quantization levels and a threshold value Th (step S403). Specifically, when the color signal indicates ON, the quantization-level and threshold-value setting section 301 refers to the glossiness buffer 104 to set the glossinesses G_Ink and G_Ink_Clear as quantization levels and also sets the threshold value Th to an intermediate value, (G_Ink_Clear+G_Ink)/2, of the quantization levels. When the color signal indicates OFF, the section 301 sets the glossinesses G_Medium and G_Medium_Clear as quantization levels and also sets the threshold value Th to an intermediate value, (G_Medium_Clear+G_Medium)/2, of the quantization levels.

Figure 5:
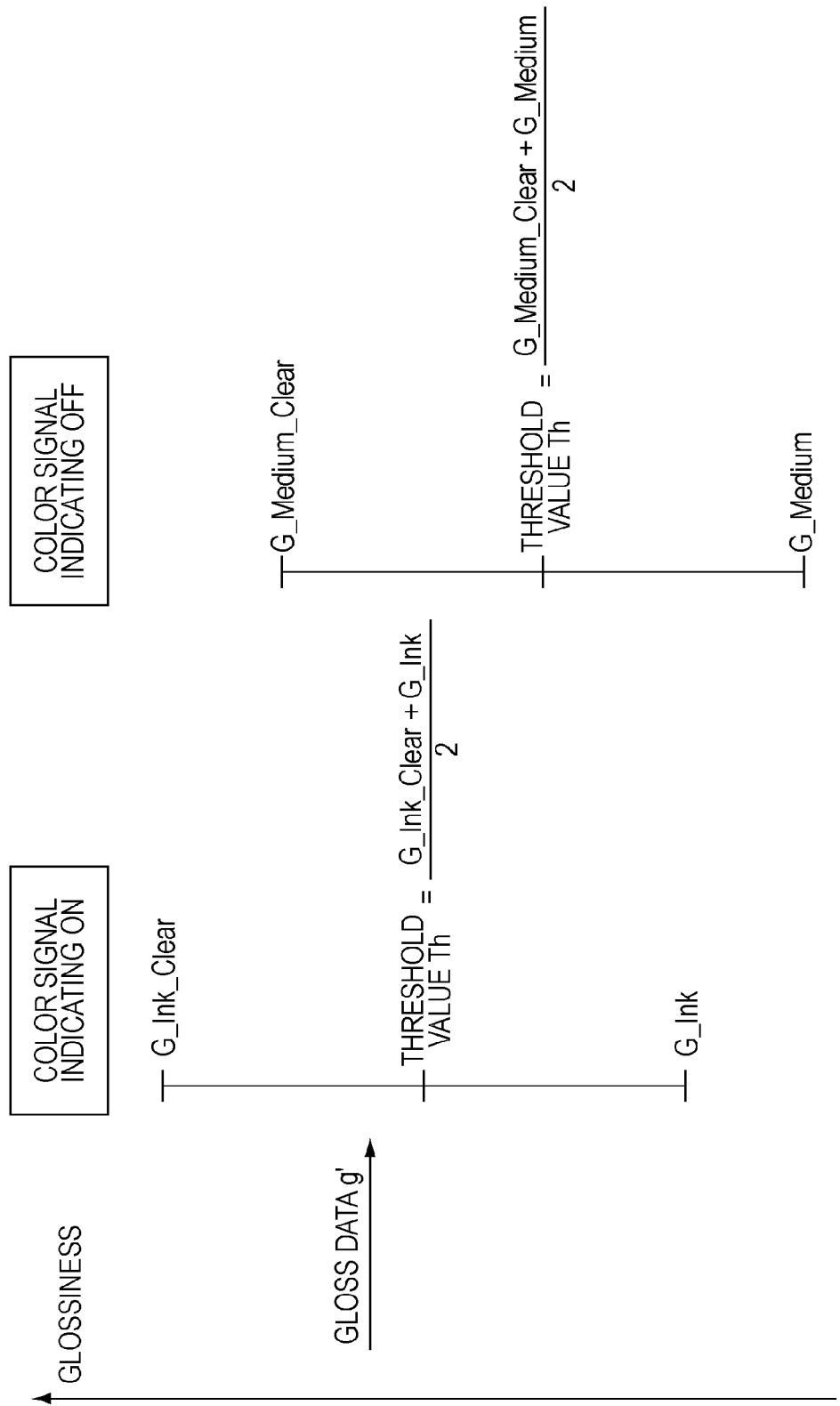
FIG. 5 is a diagram illustrating the relationship between each threshold value and corresponding quantization levels.

FIG. 5 is a diagram illustrating the relationship between each threshold value Th and corresponding quantization levels. The axis of ordinates indicates the glossiness. FIG. 5 illustrates gloss data g', the relationship between the threshold value Th and the quantization levels obtained when the color signal indicates ON, and that obtained when the color signal indicates OFF.

The gloss halftoning unit 105 allows the binarization section 303 to binarize the gloss data g'(x, y) on the basis of the set quantization levels and the threshold value Th (step S404). A binarization result out(x, y) is expressed as follows.

```
if (color signal == ON) {                        (2)
    if (g'(x, y) => Th)
        out(x, y) = G_Ink_Clear;
    else
        out(x, y) = G_Ink;
}
if (color signal == OFF) {
    if (g'(x, y) => Th)
        out(x, y) = G_Medium_Clear;
    else
        out(x, y) = G_Medium;
}
```

The gloss halftoning unit 105 allows the subtractor 304 to calculate the quantization error e(x, y) (step S405).

$$e(x, y) = g'(x, y) - out(x, y) \quad (3)$$

Subsequently, the gloss halftoning unit 105 allows the error diffusion section 305 to diffuse the quantization error, thus updating the diffusion error d(x, y) of each pixel in the accumulated error buffer 306 (step S406).

$$d(i, j) = d(i, j) + a(i, j) * e(i, j) \quad (4)$$

where, (i, j) denotes coordinates in the error diffusion matrix and a(i, j) denotes an error diffusion coefficient.

After that, the signal conversion section 307 in the gloss halftoning unit 105 refers to the glossiness buffer 104 to convert the binarization result out(x, y) into a gloss signal G (step S407).

```
if (out(x, y) == G_Ink_Clear | out(x, y) ==      (5)
    G_Medium_Clear)
    G = '1';
if (out(x, y) == G_Ink | out(x, y) == G_Medium)
    G = '0';
```

Formed Images

Comparison of an image formed using the gloss control material 108 to an image formed without the gloss control material 108 will now be described.

Figures 7A, 7B:
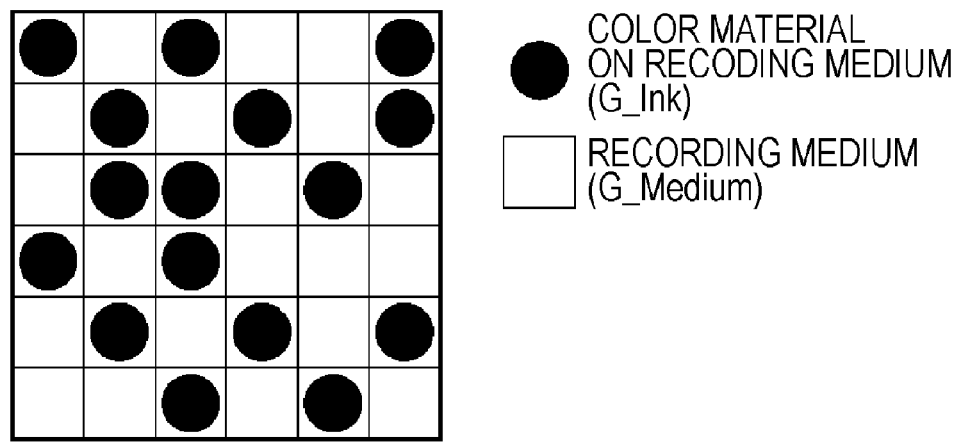
FIG. 7A illustrates arrangement of dots of an image formed using a color material without a gloss control material.
FIG. 7B is a diagram illustrating glossinesses in the image.
Figures 8A, 8B:
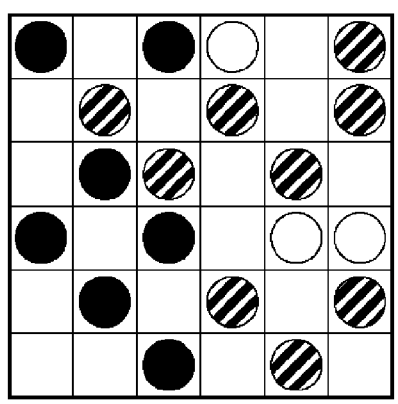
FIG. 8A illustrates arrangement of dots of an image formed using a color material and a gloss control material.
FIG. 8B is a diagram illustrating glossinesses in the image.

FIG. 6 is a diagram illustrating the glossinesses, expressed numerically, of respective pixels of an image. The glossinesses are normalized between 0 and 100. FIG. 7A illustrates arrangement of dots in the image formed using only the color material 107 without the gloss control material 108. FIG. 7B illustrates the glossinesses of respective pixels of the image. FIG. 8A illustrates arrangement of dots in the image formed by the above-described method using the gloss control material 108. FIG. 8B illustrates the glossinesses of respective pixels of the image.

In the image formed without the gloss control material 108, as shown in FIG. 7A, the glossinesses in the image are expressed at two levels of (i) G_Medium and (ii) G_Ink. Accordingly, glossiness control according to the glossinesses of the image (see FIG. 6) is not performed as shown in FIG. 7B.

Whereas, in the image formed by the above-described method using the gloss control material 108, as shown in FIG. 8A, the glossinesses in the image are expressed at four levels of (i) G_Medium, (ii) G_Ink, (iii) G_Medium_Clear, and (iv) G_Ink_Clear. In addition, glossiness control according to the glossinesses in the image (FIG. 6) is performed by subjecting gloss data to error diffusion. The characteristics of the image in which the glossinesses increase from left to right in the image in a manner similar to the image shown in FIG. 6 can be reproduced as shown in FIG. 8B.

As described above, quantization levels are changed on the basis of quantization information (color signal) regarding the grayscale of a color, and gloss data is subjected to error diffusion. Consequently, the grayscale levels of the color and glossinesses can be reproduced. The colors and texture of an object can be favorably reproduced on a printed material.

Image processing according to a second embodiment of the present embodiment will be described below. In the second embodiment, the same components as those in the first embodiment are designated by the same reference numerals and a detailed description of the previously described components is omitted.

In the first embodiment, the use of the gloss control material has been described. In the second embodiment, gloss reproduction using a plurality of color materials having different colors and glossinesses instead of the gloss control material will be described as an example.

Configuration of Apparatus

Figure 9:
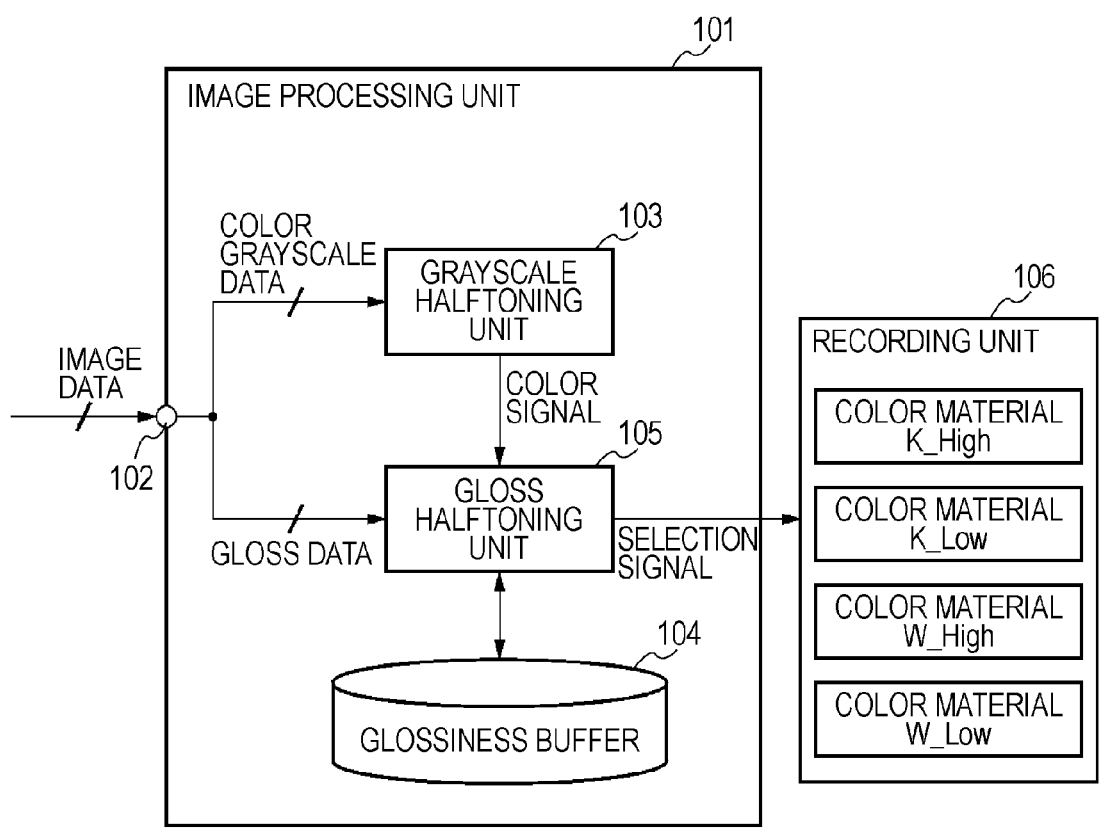
FIG. 9 is a block diagram illustrating an exemplary configuration of an image processing apparatus according to a second embodiment of the present invention.

FIG. 9 is a block diagram illustrating an exemplary configuration of an image processing apparatus according to the second embodiment.

A grayscale halftoning unit 103 quantizes color grayscale data. A gloss halftoning unit 105 refers to data in a glossiness buffer 104 to perform quantization related to gloss on gloss data. In the following description, for the sake of simplicity, it is assumed that quantization is binarization, the grayscale halftoning unit 103 outputs a color signal indicating application or non-application (ON or OFF) of a color material, and the gloss halftoning unit 105 outputs a selection signal indicating a selected color material.

A recording unit 106 is provided with a black color material K and a white color material W (though a color material of a color similar to that of the surface of a recording material is preferably used). Furthermore, the recording unit 106 is provided with two kinds of color materials of different glossinesses for each color material, namely, a high-gloss color material K_High, a low-gloss color material K_Low, a high-gloss color material W_High, and a low-gloss color material W_Low.

The glossiness buffer 104 previously stores gloss data (glossinesses) related to the color materials. The glossinesses are expressed as follows.
- G_High_W: the glossiness obtained by applying the color material W_High to the recording medium;
- G_Low_W: the glossiness obtained by applying the color material W_Low to the recording medium;
- G_High_K: the glossiness obtained by applying the color material K_High to the recording medium; and
- G_Low_K: the glossiness obtained by applying the color material K_Low to the recording medium, where G_Low_W<G_High_W and G_Low_K<G_High_K.

Image Processing Unit

Figure 10:
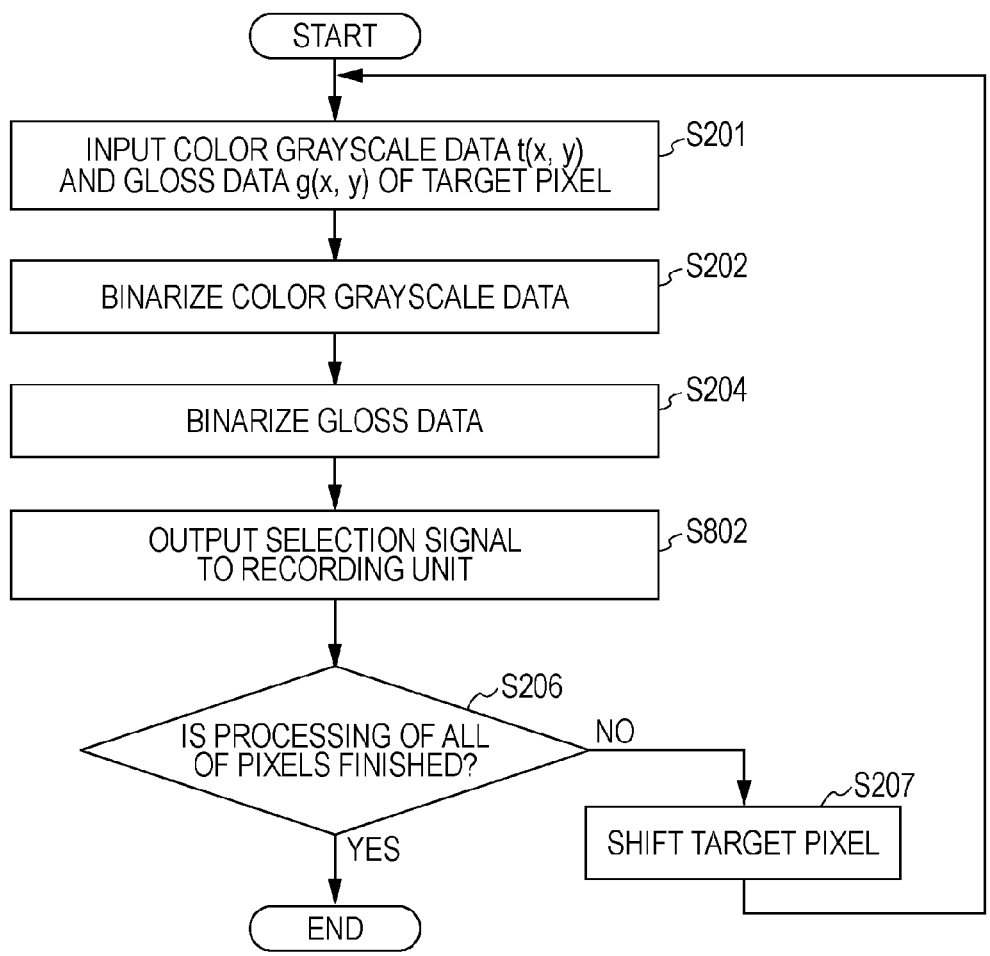
FIG. 10 is a flowchart explaining an operation of an image processing unit.

FIG. 10 is a flowchart explaining an operation of an image processing unit 101. Steps other than step S802 are the same as those in the process of FIG. 2 in the first embodiment (but this flowchart of FIG. 10 does not include step S203 in FIG. 2).

As will be described in detail below, the image processing unit 101 allows the gloss halftoning unit 105 to binarize gloss data g(x, y) with reference to the glossiness buffer 104 (step S204) and output a selection signal, generated by binarization, to the recording unit 106 (step S802).

Gloss Halftoning Unit

Figure 11:
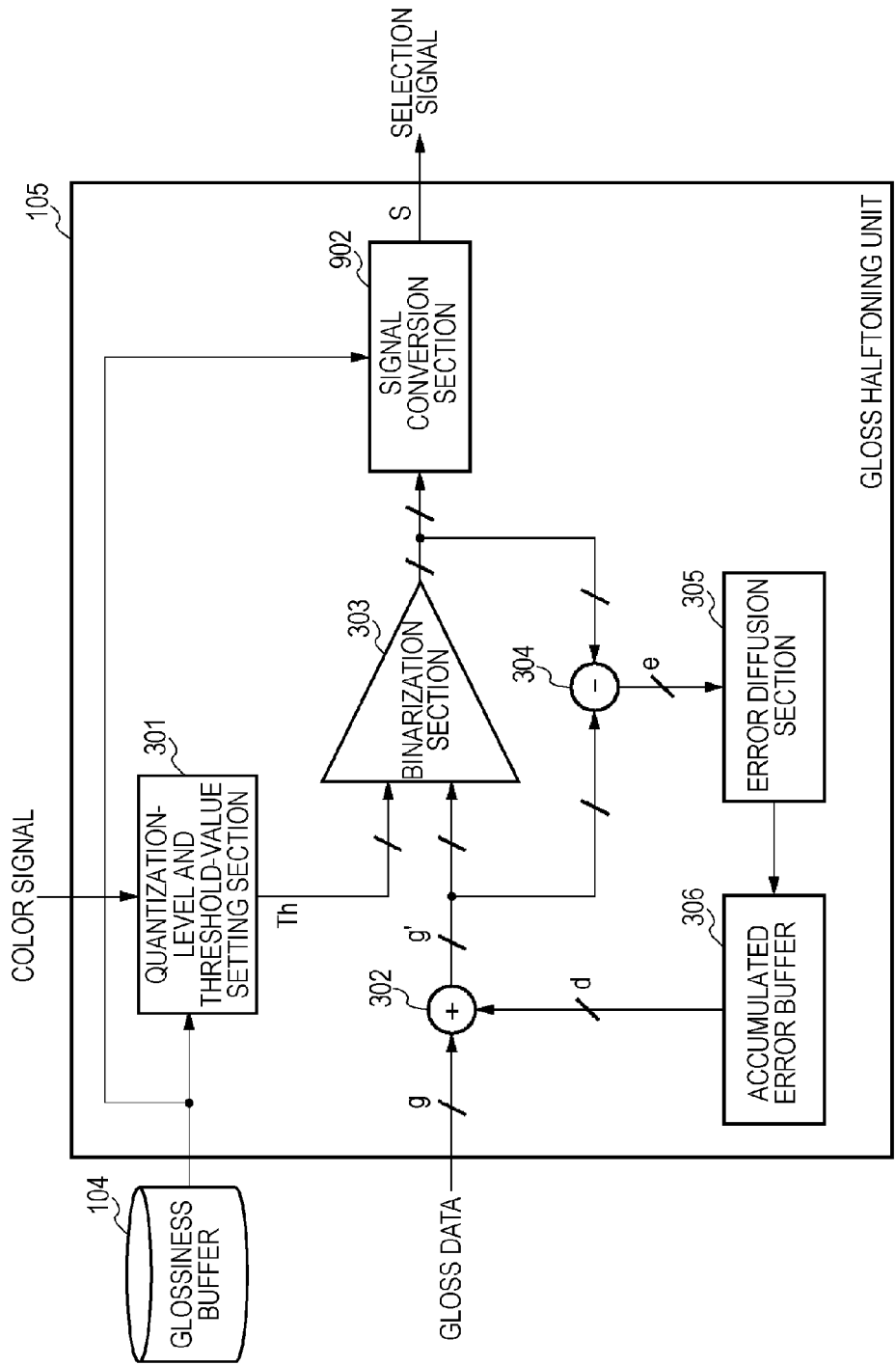
FIG. 11 is a block diagram illustrating an exemplary configuration of a gloss halftoning unit.

FIG. 11 is a block diagram illustrating an exemplary configuration of the gloss halftoning unit 105.

The configuration of FIG. 11 is substantially the same as that of FIG. 3, except for a signal conversion section 902 that converts an output of a binarization section 303 into a selection signal of two bits.

Figure 12:
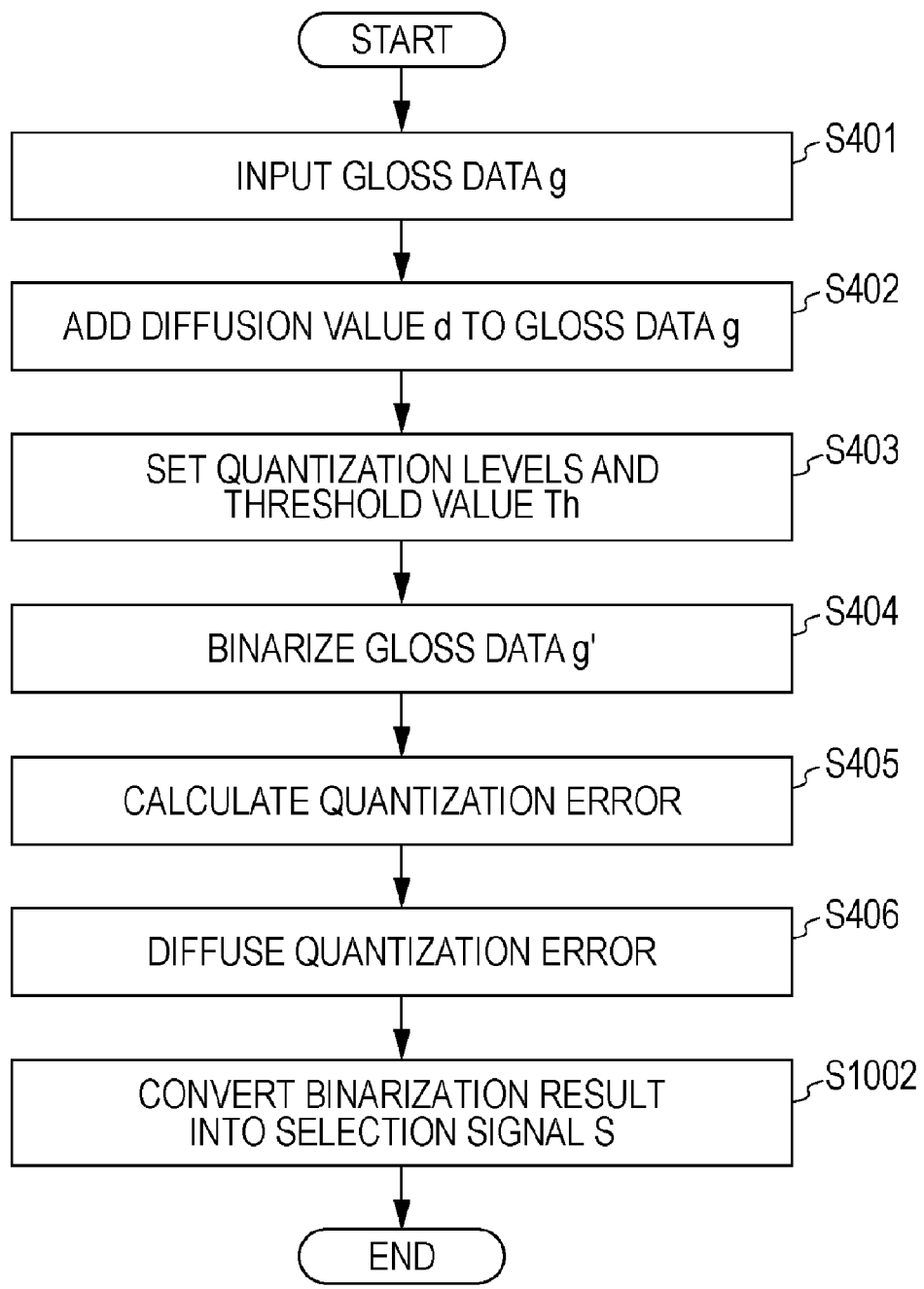
FIG. 12 is a flowchart explaining an operation, performed on each pixel, of the gloss halftoning unit.

FIG. 12 is a flowchart explaining an operation (corresponding to steps S204 and S802), performed on each pixel, of the gloss halftoning unit 105. Only the difference between the process of FIG. 12 and that of FIG. 4 in the first embodiment will be described below.

The gloss halftoning unit 105 allows a quantization-level and threshold-value setting section 301 to set quantization levels and a threshold value Th (step S403). Specifically, when a color signal indicates OFF, it is determined that the color materials W are used. The quantization-level and threshold-value setting section 301 refers to the glossiness buffer 104 to set the glossinesses G_Low_W and G_High_W as quantization levels and also set the threshold value Th to an intermediate value, (G_Low_W+G_High_W)/2, of the quantization levels. When a color signal indicates ON, it is determined that the color materials K are used. The quantization-level and threshold-value setting section 301 sets the glossinesses G_Low_K and G_High_K as quantization levels and also sets the threshold value Th to an intermediate value, (G_Low_K+G_High_K)/2, of the quantization levels.

FIG. 13 is a diagram illustrating the relationship between each threshold value Th and corresponding quantization levels. The axis of ordinates denotes the glossiness. FIG. 13 illustrates gloss data g'(x, y), the relationship between the threshold value Th and the quantization levels obtained when the color signal indicates ON (the color materials K are used), and that obtained when the color signal indicates OFF (the color materials W are used).

The binarization section 303 in the gloss halftoning unit 105 binarizes the gloss data g'(x, y) on the basis of the set quantization levels and the threshold value Th (step S404). A binarization result out (x, y) is as follows.

$$\begin{aligned}&\text{if (color signal == OFF) \{} \\ &\quad \text{if (g'(x, y) => Th)} \\ &\quad\quad \text{out(x, y) = G\_High\_W;} \\ &\quad \text{else} \\ &\quad\quad \text{out(x, y) = G\_Low\_W;} \\ &\text{\}} \\ &\text{if (color signal == ON) \{} \\ &\quad \text{if (g'(x, y) => Th)} \\ &\quad\quad \text{out(x, y) = G\_High\_K;} \\ &\quad \text{else} \\ &\quad\quad \text{out(x, y) = G\_Low\_K;} \\ &\text{\}} \end{aligned} \quad (6)$$

The signal conversion section 902 of the gloss halftoning unit 105 refers to the glossiness buffer 104 to convert the binarization result out(x, y) into a selection signal S (step S1002).

$$\begin{aligned}&\text{if (out(x, y) == G\_High\_W)} \\ &\quad \text{S = 0 (that indicates the use of the color material W\_High);} \\ &\text{if (out(x, y) == G\_Low\_W)} \\ &\quad \text{S = 1 (that indicates the use of the color material W\_Low);} \\ &\text{if (out(x, y) == G\_High\_K)} \\ &\quad \text{S = 2 (that indicates the use of the color material K\_High);} \\ &\text{if (out(x, y) == G\_Low\_K)} \\ &\quad \text{S = 3 (that indicates the use of the color material K\_Low);} \end{aligned} \quad (7)$$

Accordingly, the recording unit 106 selectively uses the color materials in accordance with the values of the selection signals S to record dots.

Formed Images

Comparison of an image formed using a plurality of color materials of different colors and glossinesses to an image formed using a single color material will be described below.

Figures 14A, 14B:
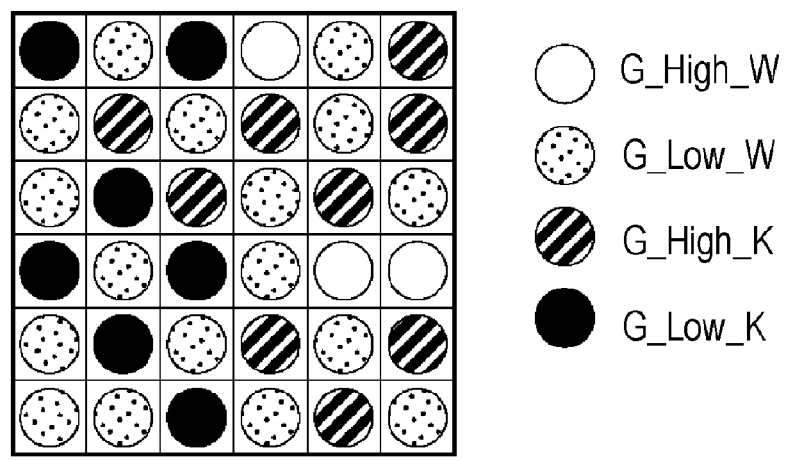
FIG. 14A is a diagram illustrating arrangement of dots of an image formed using a plurality of color materials of different colors and glossinesses.
FIG. 14B is a diagram illustrating glossinesses in the image.

FIG. 14A illustrates arrangement of dots of the image formed according to the above-described method using the color materials of different colors and glossinesses. FIG. 14B illustrates the glossinesses of respective pixels in the image. Glossinesses in an original image are the same as those in FIG. 6. Arrangement of dots of the image formed using the single color material and the glossinesses of respective pixels in the image are the same as those in FIGS. 7A and 7B.

In the case where the image is formed according to the above-described method using the color materials of different colors and glossinesses, the glossinesses in the image are expressed at four levels of (i) G_High_W, (ii) G_Low_W, (iii) G_High_K, and (iv) G_Low_K as shown in FIG. 14A. In addition, since the gloss data is subjected to error diffusion, glossiness control according to the glossinesses in the image (FIG. 6) is performed. Thus, the characteristics of the image in which the glossinesses increase from left to right in the image in a manner similar to the image shown in FIG. 6 can be reproduced as shown in FIG. 14B.

As described above, the color materials of different colors and glossinesses (including the color materials of the same color and different glossinesses) are selectively used instead of a gloss control material. Thus, the same advantages as those of the first embodiment can be obtained.

Modification

The above-described embodiments have been described with respect to the case where the present invention is applied to an inkjet printer. The present invention is applicable to an electrophotographic printer.

The first embodiment has been described with respect to the case where applying the gloss control material increases glossiness. If applying the gloss control material decreases glossiness (G_Ink>G_Ink_Clear and G_Medium> G_Medium_Clear), the glossiness can be controlled in the same manner.

In the first embodiment, the case using a single color material has been described. The present invention is also applicable to a case where two or more color materials are used. In this case, the glossiness buffer 104 has to store the glossiness of each color material, the glossiness of superimposition of different color materials, and the glossiness of the gloss control material applied to the superimposition of different color materials, namely, the glossiness of the combination of the gloss control material and the different color materials. Quantization levels and a threshold value Th are set in accordance with the ON or OFF state of each of color signals corresponding to the color materials.

The second embodiment has been described with respect to the case where the white color materials W_High and W_Low are used as colors similar to the color of the surface of a recording medium. Only the black color materials K_Low and K_High can be used. In this case, the glossiness of a dot with no color materials is the glossiness G_Medium of the recording medium. Accordingly, when a color signal indicates OFF, a selection signal S having a value indicating that any color material is not selected is output. The difference between glossiness indicated by gloss data g' and the glossiness G_Medium may be used as a quantization error.

In the above description, gloss has been described as an example of texture. Another data indicating texture, e.g., data indicating unevenness of the surface of an object may be substituted for gloss data.

Further, in the above-described exemplary embodiments, the various above-described units can be activated according to a program stored in a computer (central processing unit (CPU) or micro processing unit (MPU)). In such a case, the code (e.g., software program) for realizing the functions of each above-described exemplary embodiment is supplied to a computer in an apparatus or a system connected to the various above-described units so as to activate the units so that the functions of a color processing parameter editing apparatus are realized.

For example, driver software installed in a computer can be used to perform the image processing. Further, in this case, the code of the above-described software program itself realizes the functions of each above-described exemplary embodiment. The code itself may be stored on a computer-readable storage medium which supplies the code to a computer.

In the case where the present invention is applied to the storage medium, the storage medium stores a computer program corresponding to or relating to the above-described flowcharts.

According to the embodiments, a color and texture can be favorably reproduced.

As many apparently widely different embodiments of the present invention can be made without departing from the spirit and scope thereof, it is to be understood that the invention is not limited to the specific embodiments thereof except as defined in the appended claims.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2008-185292, filed Jul. 16, 2008, which is hereby incorporated by reference herein in its entirety.

What is claimed is:

1. An image processing apparatus comprising:
an input unit configured to input image data including color separation data and gloss data of an image;
a color signal generation unit configured to generate a color signal obtained by quantizing the color separation data;
a gloss signal generation unit configured to generate a gloss signal obtained by quantizing the gloss data of the image on the basis of the color signal and gloss data related to a recording medium, a color material, and a gloss control material; and
a forming unit configured to form an image on the recording medium on the basis of the color signal and the gloss signal using the color material and the gloss control material.

2. The apparatus according to claim 1, wherein the gloss signal generation unit refers to the gloss data related to the recording medium, the color material, and the gloss control material to set a threshold value for quantization of the gloss data of the image and quantization levels of the gloss data of the image according to the color signal.

3. The apparatus according to claim 1, further comprising:
a storage unit configured to store gloss data related to the surface of the recording medium, gloss data obtained when the color material is applied to the recording medium, gloss data obtained when the gloss control material is applied to the recording medium, and gloss data obtained when the color material is applied to the recording medium and the gloss control material is superimposed to the color material on the recording medium as the gloss data related to the recording medium, the color material, and the gloss control material.

4. The apparatus according to claim 1, wherein the gloss data is data indicating unevenness of the image on the recording medium.

5. The apparatus according to claim 1, wherein the color material is provided in a plurality and the color materials include color materials of the same color and different glossinesses.

6. The apparatus according to claim 1, wherein the quantization is error diffusion.

7. The apparatus according to claim 2, wherein the threshold value and the quantization levels vary depending on the gloss data and the color signal.

8. A method for image processing comprising:
inputting image data including color separation data and gloss data of an image;
generating a color signal obtained by quantizing the color separation data;
generating a gloss signal obtained by quantizing the gloss data of the image on the basis of the color signal and gloss data related to a recording medium, a color material, and a gloss control material; and
forming an image on the recording medium on the basis of the color signal and the gloss signal using the color material and the gloss control material.

9. The method according to claim 8, further comprising:
referring to the gloss data related to the recording medium, the color material, and the gloss control material to set a threshold value for quantization of the gloss data of the image and quantization levels of the gloss data of the image according to the color signal.

10. The method according to claim 8, further comprising:
storing gloss data related to the surface of the recording medium, gloss data obtained when the color material is applied to the recording medium, gloss data obtained when the gloss control material is applied to the recording medium, and gloss data obtained when the color material is applied to the recording medium and the gloss control material is superimposed to the color material on the recording medium as the gloss data related to the recording medium, the color material, and the gloss control material.

11. The method according to claim 8, wherein the gloss data is data indicating unevenness of the image on the recording medium.

12. The method according to claim 8, wherein the color material is provided in a plurality and the color materials include color materials of the same color and different glossinesses.

13. The method according to claim 8, wherein the quantization is error diffusion.

14. The method according to claim 9, wherein the threshold value and the quantization levels vary depending on the gloss data and the color signal.

15. A non-transitory computer-readable storage medium that stores a program executed by an image processing apparatus, the program comprising:
inputting image data including color separation data and gloss data of an image;
generating a color signal obtained by quantizing the color separation data;
generating a gloss signal obtained by quantizing the gloss data of the image on the basis of the color signal and gloss data related to a recording medium, a color material, and a gloss control material; and
forming an image on the recording medium on the basis of the color signal and the gloss signal using the color material and the gloss control material.

* * * * *